Feb. 16, 1965 E. E. CANDILIS 3,170,124
TUNNEL DIODE PULSE GENERATOR HAVING INDEPENDENTLY
CONTROLLABLE PULSE WIDTH AND REPETITION RATE
Filed Oct. 10, 1961

INVENTOR
EMMANUEL E. CANDILIS
BY J. I. Chojnacki
ATTORNEY 3,170,124
Patented Feb. 16, 1965

3,170,124

TUNNEL DIODE PULSE GENERATOR HAVING INDEPENDENTLY CONTROLLABLE PULSE WIDTH AND REPETITION RATE

Emmanuel E. Candilis, Palo Alto, Calif., assignor to Hewlett-Packard Company, Palo Alto, Calif., a corporation of California Filed Oct. 10, 1961, Ser. No. 144,131
5 Claims. (Cl. 331—111)

This invention relates to pulse generators which use solid state elements to produce sharp pulses whose width and repetition rates are independently adjustable over a wide range of values.

Many timing circuits which produce short pulses at predetermined intervals operate according to the relaxation oscillation principle. These circuits rely for their timing accuracy upon the charging and relaaxtion (or discharge) of an energy storage element such as a capacitor. The repetition rate of pulses thus produced may be varied by varying the time constant provided by the energy storage element and a resistor. However, since the output pulse is usually produced during the relaxation period, varying the size of the resistor or storage element to vary the repetition rate also varies the pulse width. In addition, varying the period of relaxation to vary the pulse width produces a variation in the repetition rate. In certain pulse applications the pulse width and repetition rate must be independently adjustable.

Accordingly, it is an object of the present invention to provide a pulse generator which produces pulses having a repetition rate and pulse width that are independently adjustable.

In accordance with the illustrated embodiment of the present invention a tunnel diode is connected to the input of a transistor switch. Current having a time-varying amplitude that is related to the time-varying voltage produced by a resistance-capacitance charging circuit is applied to the tunnel diode. When the applied current increases to a predetermined value, the tunnel diode causes the transistor switch to become conductive and thereby to provide a discharge path for the charging circuit capacitor. The pulse width is determined substantially by the impedance of the discharge path and the repetition rate is determined substantially by the time constant of the charging circuit.

Figure 1:
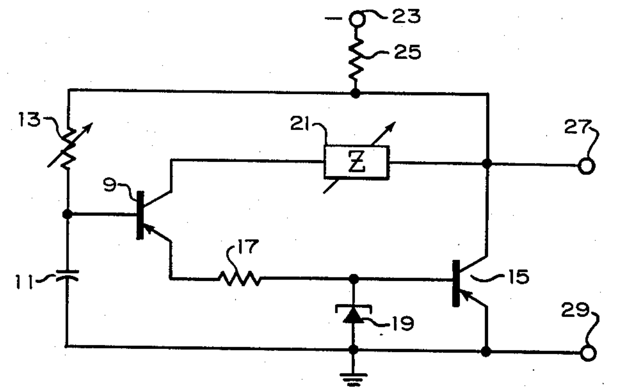
Figure 2:
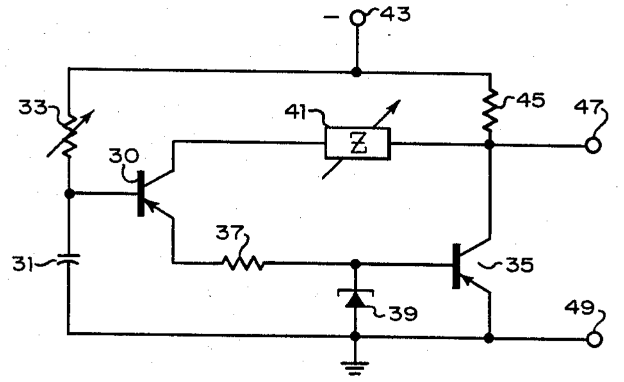
Figure 3:
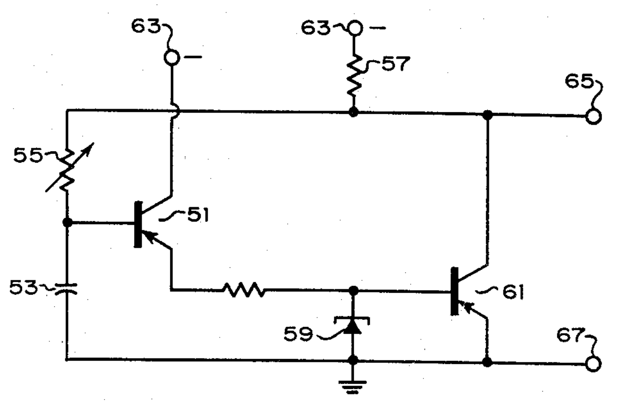

Other and incidental objects of the present invention will be apparent from a reading of this specification and an inspection of the accompanying drawing in which:

FIGURE 1 is a schematic diagram of a pulse generator according to the present invention, FIGURE 2 is a schematic diagram showing a preferred embodiment of the pulse generator of the present invention, and FIGURE 3 is a schematic diagram showing a modification of the pulse generator of FIGURE 1.

Referring now to FIGURE 1, there is shown a transistor 9 connected to receive the output of the charging circuit which comprises the series circuit including capacitor 11, adjustable resistor 13 and resistor 25 connected between ground and voltage supply 23. This charging circuit may be considered to be a ramp generator which produces a substantially linear function of voltage with time over a small increment of time. The emitter electrode of transistor 9 is connected to the base electrode of transistor 15 through resistor 17. A tunnel diode 19 is connected in shunt with the base-emitter junction of transistor 15. The collector electrode of transistor 15 is connected to the collector electrode of transistor 9 through variable impedance element 21 and is connected to the common terminal of resistor 25 and adjustable resistor 13. Output terminal 27 and ground terminal 29 are connected to receive the signal appearing across the collector-emitter junction of transistor 15.

In operation, the voltage across capacitor 11 increases toward the supply voltage 23 with a time constant that is determined substantially by the capacitor 11 and resistors 13 and 25. At the start of the charging period tunnel diode 19 operates in the low voltage positive resistance region. This low voltage drop across tunnel diode 19 maintains transistor 15 in the non-conductive state. As the voltage across capacitor 11 increases the emitter current of transistor 9 increases, thereby increasing the current through tunnel diode 19. The tunnel diode switches to operation in the high voltage positive resistance region when the current provided by the emitter circuit of transistor 9 exceeds the peak tunnel diode current permissible for operation in the low voltage positive resistance region. The increased voltage across the tunnel diode causes transistor 15 to become highly conductive. The increase in the conductivity of transistor 15 causes the voltage appearing across the collector-emitter junction to decrease substantially to zero potential. Thus, transistor 15 operates as a phase inverter on applied signals. Since the voltage on the collector electrode of transistor 9 also decreases substantially to zero, the base-collector junction of transistor 9 becomes forward biased by the voltage appearing across capacitor 11. This junction becomes highly conductive and, in conjunction with the saturated transistor 15, provides a discharge path for the capacitor 11. The discharge of capacitor 11 thus serves to reset the charging circuit which includes resistor 13 and capacitor 11. The emitter electrode of transistor 9 is clamped to the base and collector electrodes (within a few tenths of volts) during the time the base-collector junction is forward biased. This maintains the current flow through tunnel diode 19 during discharge of capacitor 11 until this current drops to a value related to the voltage across capacitor 11 which is insufficient to maintain tunnel diode 19 in the high voltage operating state. When the tunnel diode changes operating state, the low voltage drop across it renders transistor 15 nonconductive, thereby terminating the discharge cycle of capacitor 11. Another discharge path is provided by resistor 13 and the saturated transistor 15. Only a small portion of the discharge current flows in this path and hence it does not contribute materially to the operation of the circuit. If the variable impedance element 21 is adjusted for minimum impelance, the pulse produced at the output terminals 27 and 29 has a minimum width, which width is determined primarily by the parameters of the transistors used in the circuit. Increasing the impedance of variable impedance element 21 increases the pulse width of the output pulse because of the increased time required for capacitor 11 to discharge through the discharge path. The variable impedance element 21 may thus be a variable inductor, variable resistor or a transistor circuit having adjustable conductivity. Capacitor 11 continues to discharge until the current in the tunnel diode 19 provided by the emitter circuit of transistor 9 drops below the minimum or valley current for the diode, which current in the emitter circuit is controlled by the capacitor voltage. The tunnel diode then switches to operation in the low voltage positive resistance region. This low voltage renders transistor 15 non-conductive, thereby precluding further discharging of the capacitor 11 and permitting recycling of the circuit operation.

The performance of the pulse generator may be improved by arranging the circuit according to FIGURE 2. The charging circuit of the circuit of FIGURE 2 is connected directly between the voltage supply 43 and ground. This allows the voltage across capacitor 31 to increase substantially as an exponential function of time, independent of variations in the current drawn by transistor 30 during the charging cycle. Transistor 30 operates similar to transistor 9 of FIGURE 1, previously described, during the discharge cycle of capacitor 31. This improvement over the circuit of FIGURE 1 also obviates the need for resetting the adjustable resistor of the charging circuit to obtain a given frequency after the transistor 9 of FIGURE 1 is replaced.

Referring now to the circuit of FIGURE 3, there is shown a simplified version of the pulse generator of the present invention. While the variable impedance elements used in the discharged paths in the circuits of FIGURES 1 and 2 may be adjusted to provide square wave outputs, additional circuit economy is obtained by arranging the circuit according to FIGURE 3 for applications requiring only square waveforms of variable repetition frequency. An emitter follower 51 is connected to receive the output of the charging circuit which comprises the series combination of capacitor 53, adjustable resistor 55 and resistor 57. Tunnel diode 59 is biased to operate normally in the low voltage positive resistance region. The diode switches to operation in the high voltage positive resistance region when the current applied thereto from the emitter circuit of transistor 51 exceeds the peak current permissible for operation in the low voltage region, which applied current has a time-varying amplitude related to the time-varying voltage across capacitor 53. Transistor 61, which is normally non-conductive, is made highly conductive by the increase in voltage across tunnel diode 59. Since the base-collector junction of transistor 51 remains back-biased, only one discharge path is provided for capacitor 53, which path includes resistor 55 and conducting transistor 61. The time constant of the charging circuit is thus substantially the same as the time constant of the discharge circuit. Hence, the waveform appearing at output terminals 65 and 67 is substantially a square wave having a repetition frequency that is determined by the values of capacitor 53 and resistors 55 and 57 and having an amplitude that is substantially equal to the supply voltage 63.

The circuit of the present invention thus provides output pulses having a repetition rate and pulse width that are substantially independently adjustable. This permits the rapid change of one of these parameters without having to readjust the other of these parameters and is thus readily adaptable for use in applications requiring programmed changes in pulse rate and pulse width. In addition, since the amplitude of the current in the tunnel diode determines the time at which the transistor switch changes conductivity, external current pulses may be applied to the tunnel diode to trigger the output waveform.

I claim:

1. A signal generator comprising:

a first transistor circuit having an input and an output;

a tunnel diode which shows in the current-voltage characteristics thereof a region of negative resistance between adjacent regions of positive resistance;

said tunnel diode being connected to the input of the first transistor and being adapted to operate in the low voltage positive resistance region for signals applied thereto below a selected value;

a charging circuit having an output and including resistance and capacitance;

circuit means having first, second and third terminals and including a plurality of P-N semiconductor junctions at least some of which comprise the base-emitter and base-collector junctions of a second transistor circuit connected to the first and second terminals for providing substantially unity voltage gain between said first and second terminals and at least one of which operates with unidirectional conductivity between the first and third terminals;

means connecting the first and second terminals of said circuit means respectively to the output of the charging circuit and to the tunnel diode for switching the tunnel diode to operation in the high voltage positive resistance region in response to the signal appearing on said second terminal of the circuit means exceeding said selected value;

said first transistor circuit producing a signal at the output thereof in response to the change in the voltage across the tunnel diode; and means connecting the third and first terminals of said circuit means respectively to the output of the first transistor and circuit to said charging circuit for discharging said capacitance in response to signal appearing at the output of said first transistor circuit;

said tunnel diode being returned to operation in the low voltage positive resistance region in response to signal applied thereto from the second terminal of said circuit means decreasing below said selected value.

2. A signal generator comprising:

a phase inverter having an input and an output;

a tunnel diode which shows in the current-voltage characteristics thereof a region of negative resistance between adjacent regions of positive resistance;

said tunnel diode being connected to the input of the phase inverter and being adapted to operate in the low voltage positive resistance region for signals applied thereto below a selected value;

a charging circuit having an output and including resistance means and energy storage means;

circuit means having a plurality of terminals and including a signal amplifier connected to the first and second ones of said terminals for providing selected signal gain therebetween and showing unidirectional conductivity between said first terminal and a third one of said terminals;

means connecting the first and second terminals of the circuit means respectively to the output of the charging circuit and to the tunnel diode for switching the tunnel diode to operation in the high voltage positive resistance region in response to the signal applied to said tunnel diode from said second terminal of the circuit means exceeding said selected value;

said phase inverter producing a signal at the output thereof in response to the change in the regions of operation of the tunnel diode; and means connecting the first and third terminals of said circuit means respectively to the output of said charging circuit and to the output of the phase inverter for dissipating the energy stored in the energy storage means in response to the signal appearing at the output of said phase inverter;

said tunnel diode returning to operation in the low voltage positive resistance region in response to the signal applied to the tunnel diode from said second terminal of the circuit means decreasing below said selected value.

3. A signal generator according to claim 2 wherein said circuit means includes a plurality of semiconductor junctions, at least one of which forms the base-emitter junction of a transistor connected between first and said second terminals and at least another one of which shows said unidirectional conductivity between the first and third terminals of said circuit means.

4. A signal generator comprising:

a phase inverter having an input and an output;

a tunnel diode which shows in the current-voltage characteristics thereof a region of negative resistance between adjacent regions of positive resistance;

said tunnel diode being connected to the input of the phase inverter and being adapted to operate in the low voltage positive resistance region for signals applied thereto below a selected value;

a ramp generator having an output;

circuit means having a plurality of terminals and including a signal amplifier connected to the first and second ones of said terminals for providing selected signal gain therebetween and showing unidirectional conductivity between said first terminal and a third one of said terminals;

means connecting the first and second terminals of said circuit means respectively to the output of the ramp generator and to the tunnel diode for switching the tunnel diode to operation in the high voltage positive resistance region in response to the signal applied to said tunnel diode from the second terminal of said circuit means exceeding said selected value;

said phase inverter producing a signal at the output thereof in response to the change in the regions of operation of the tunnel diode; and means connecting the first and third terminals of the circuit means respectively to the output of the ramp generator and to the output of said phase inverter for resetting the output of the ramp generator in response to said signal at the output of the phase inverter;

said tunnel diode returning to operation in the low voltage positive resistance region in response to the signal applied to the tunnel diode from the second terminal of said circuit means decreasing below said selected value.

5. A signal generator comprising:

a tunnel diode which shows in the current-voltage characteristics thereof a region of negative resistance between adjacent regions of positive resistance;

the tunnel diode being adapted to operate in the low voltage positive resistance region for current applied thereto below a predetermined value;

a charging circuit having an output and being operative to produce a time-varying voltage at the output thereof;

a first transistor having a base electrode connected to the output of said charging circuit and having emitter and collector electrodes forming a current conduction path having a conductivity which is related to signal on said base electrode;

means including the current conduction path of the first transistor connected to the tunnel diode for applying thereto a time-varying current related to said time-varying voltage applied to the base electrode of said first transistor from the output of said charging circuit for switching said tunnel diode to operation in the high voltage positive resistance region in response to the current applied thereto exceeding said predetermined current value;

a second transistor having base and emitter electrodes forming an input circuit and having emitter and collector electrodes forming an output circuit;

means connecting the input circuit of the second transistor to said tunnel diode for producing a signal at the output circuit of the second transistor in response to the change in the regions of operation of the tunnel diode; and a circuit including the base and collector electrodes of the first transistor and connecting the charging circuit and the output circuit of said second transistor for resetting the time-varying voltage at the output of the charging circuit in response to a signal appearing at the output circuit of the second transistor;

said tunnel diode returning to operation in the low voltage positive resistance region in response to the current applied thereto by said first transistor decreasing below said predetermined current value.

References Cited by the Examiner

UNITED STATES PATENTS

| | | | |
|---|---|---|---|
| 3,011,068 | 11/61 | McVey | 307—88.5 |
| 3,047,819 | 7/62 | Haas | 331—132 |

OTHER REFERENCES

"Tunnel Diode Applications" by Todd. Publication by Hughes Aircraft Co. in Application Engineering Notes dated May 1960, Figures 10 and 15.

"Tunnel Diode Manual" by General Electric Co. dated March 1961. Pages 46–47 and Fig. 5.5

ARTHUR GAUSS, *Primary Examiner.*

JOHN W. HUCKERT, *Examiner.*